| (12) | United States Patent | (10) Patent No.: | US 11,123,973 B2 |
|---|---|---|---|
| | Bucknell et al. | (45) Date of Patent: | Sep. 21, 2021 |

(54) INTERCONNECTED DEFLECTABLE PANEL AND NODE

(71) Applicant: DIVERGENT TECHNOLOGIES, INC., Los Angeles, CA (US)

(72) Inventors: John Russell Bucknell, El Segundo, CA (US); Eahab Nagi El Naga, Topanga, CA (US); Antonio Bernerd Martinez, El Segundo, CA (US); Stuart Paul Macey, Laguna Niguel, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 77 days.

(21) Appl. No.: 15/616,620

(22) Filed: Jun. 7, 2017

(65) Prior Publication Data

US 2018/0354204 A1 Dec. 13, 2018

(51) Int. Cl.
| | |
|---|---|
| *B33Y 80/00* | (2015.01) |
| *F16B 5/00* | (2006.01) |
| *F16B 11/00* | (2006.01) |
| *F16B 17/00* | (2006.01) |
| *B32B 3/06* | (2006.01) |
| *B32B 7/12* | (2006.01) |
| *B29D 99/00* | (2010.01) |

(52) U.S. Cl.
CPC ............ *B33Y 80/00* (2014.12); *B29D 99/001* (2013.01); *F16B 5/00* (2013.01); *F16B 11/006* (2013.01)

(58) Field of Classification Search
CPC .... Y10T 428/24479; Y10T 428/24521; B33Y 80/00; F16B 5/00; F16B 11/00; F16B 17/00; B32B 3/06; B32B 7/12

USPC ......................................................... 244/131
See application file for complete search history.

(56) References Cited

U.S. PATENT DOCUMENTS

| 4,346,541 | A | * | 8/1982 | Schmitt ..................... B32B 3/28 |
| | | | | 52/309.11 |
| 5,203,226 | A | | 4/1993 | Hongou et al. |
| 5,476,704 | A | * | 12/1995 | Kohler ................. B29C 66/721 |
| | | | | 428/119 |
| 5,742,385 | A | | 4/1998 | Champa |
| 5,990,444 | A | | 11/1999 | Costin |
| 6,010,155 | A | | 1/2000 | Rinehart |
| 6,096,249 | A | | 8/2000 | Yamaguchi |

(Continued)

FOREIGN PATENT DOCUMENTS

| JP | S57-96394 U | 6/1982 |
| JP | 2002544452 A | 12/2002 |

(Continued)

OTHER PUBLICATIONS

International Search Report and Written Opinion dated Oct. 17, 2018 regarding PCT/US2018/036328.

(Continued)

*Primary Examiner* — Joanna Pleszczynska
(74) *Attorney, Agent, or Firm* — Arent Fox LLP

(57) ABSTRACT

Some embodiments of the present disclosure relate to an apparatus including an additively manufactured node having a socket. The apparatus includes a panel interconnected with node. The panel includes opposing surface layers and a core between at least a portion of the surface layers. The socket engages an end portion of the panel and shapes the surface layers on the end portion of the panel.

14 Claims, 8 Drawing Sheets

(56) References Cited

U.S. PATENT DOCUMENTS

| | | | |
|---|---|---|---|
| 6,140,602 A | 10/2000 | Costin | |
| 6,250,533 B1 | 6/2001 | Otterbein et al. | |
| 6,252,196 B1 | 6/2001 | Costin et al. | |
| 6,318,642 B1 | 11/2001 | Goenka et al. | |
| 6,365,057 B1 | 4/2002 | Whitehurst et al. | |
| 6,391,251 B1 | 5/2002 | Keicher et al. | |
| 6,409,930 B1 | 6/2002 | Whitehurst et al. | |
| 6,468,439 B1 | 10/2002 | Whitehurst et al. | |
| 6,554,345 B2 | 4/2003 | Jonsson | |
| 6,585,151 B1 | 7/2003 | Ghosh | |
| 6,644,721 B1 | 11/2003 | Miskech et al. | |
| 6,811,744 B2 | 11/2004 | Keicher et al. | |
| 6,866,497 B2 | 3/2005 | Saiki | |
| 6,919,035 B1 | 7/2005 | Clough | |
| 6,921,113 B1 | 7/2005 | Vlasblom | |
| 6,926,970 B2 | 8/2005 | James et al. | |
| 7,152,292 B2 | 12/2006 | Hohmann et al. | |
| 7,291,373 B2 * | 11/2007 | Bartley-Cho | F16B 5/01 244/131 |
| 7,344,186 B1 | 3/2008 | Hausler et al. | |
| 7,500,373 B2 | 3/2009 | Quell | |
| 7,586,062 B2 | 9/2009 | Heberer | |
| 7,637,134 B2 | 12/2009 | Burzlaff et al. | |
| 7,710,347 B2 | 5/2010 | Gentilman et al. | |
| 7,716,802 B2 | 5/2010 | Stern et al. | |
| 7,745,293 B2 | 6/2010 | Yamazaki et al. | |
| 7,766,123 B2 | 8/2010 | Sakurai et al. | |
| 7,852,388 B2 | 12/2010 | Shimizu et al. | |
| 7,908,922 B2 | 3/2011 | Zarabadi et al. | |
| 7,951,324 B2 | 5/2011 | Naruse et al. | |
| 8,094,036 B2 | 1/2012 | Heberer | |
| 8,163,077 B2 | 4/2012 | Eron et al. | |
| 8,286,236 B2 | 10/2012 | Jung et al. | |
| 8,289,352 B2 | 10/2012 | Vartanian et al. | |
| 8,297,096 B2 | 10/2012 | Mizumura et al. | |
| 8,354,170 B1 | 1/2013 | Henry et al. | |
| 8,383,028 B2 | 2/2013 | Lyons | |
| 8,408,036 B2 | 4/2013 | Reith et al. | |
| 8,429,754 B2 | 4/2013 | Jung et al. | |
| 8,437,513 B1 | 5/2013 | Derakhshani et al. | |
| 8,444,903 B2 | 5/2013 | Lyons et al. | |
| 8,452,073 B2 | 5/2013 | Taminger et al. | |
| 8,599,301 B2 | 12/2013 | Dowski, Jr. et al. | |
| 8,606,540 B2 | 12/2013 | Haisty et al. | |
| 8,610,761 B2 | 12/2013 | Haisty et al. | |
| 8,631,996 B2 | 1/2014 | Quell et al. | |
| 8,675,925 B2 | 3/2014 | Derakhshani et al. | |
| 8,678,060 B2 | 3/2014 | Dietz et al. | |
| 8,686,314 B2 | 4/2014 | Schneegans et al. | |
| 8,686,997 B2 | 4/2014 | Radet et al. | |
| 8,694,284 B2 | 4/2014 | Berard | |
| 8,720,876 B2 | 5/2014 | Reith et al. | |
| 8,752,166 B2 | 6/2014 | Jung et al. | |
| 8,755,923 B2 | 6/2014 | Farahani et al. | |
| 8,787,628 B1 | 7/2014 | Derakhshani et al. | |
| 8,818,771 B2 | 8/2014 | Gielis et al. | |
| 8,873,238 B2 | 10/2014 | Wilkins | |
| 8,968,046 B2 * | 3/2015 | Cochella | A63H 33/062 446/111 |
| 8,978,535 B2 | 3/2015 | Ortiz et al. | |
| 9,006,605 B2 | 4/2015 | Schneegans et al. | |
| 9,071,436 B2 | 6/2015 | Jung et al. | |
| 9,101,979 B2 | 8/2015 | Hofmann et al. | |
| 9,104,921 B2 | 8/2015 | Derakhshani et al. | |
| 9,126,365 B1 | 9/2015 | Mark et al. | |
| 9,128,476 B2 | 9/2015 | Jung et al. | |
| 9,138,924 B2 | 9/2015 | Yen | |
| 9,149,988 B2 | 10/2015 | Mark et al. | |
| 9,156,205 B2 | 10/2015 | Mark et al. | |
| 9,186,848 B2 | 11/2015 | Mark et al. | |
| 9,244,986 B2 | 1/2016 | Karmarkar | |
| 9,248,611 B2 | 2/2016 | Divine et al. | |
| 9,254,535 B2 | 2/2016 | Buller et al. | |
| 9,266,566 B2 | 2/2016 | Kim | |
| 9,269,022 B2 | 2/2016 | Rhoads et al. | |
| 9,327,452 B2 | 5/2016 | Mark et al. | |
| 9,329,020 B1 | 5/2016 | Napoletano | |
| 9,332,251 B2 | 5/2016 | Haisty et al. | |
| 9,346,127 B2 | 5/2016 | Buller et al. | |
| 9,389,315 B2 | 7/2016 | Bruder et al. | |
| 9,399,256 B2 | 7/2016 | Buller et al. | |
| 9,403,235 B2 | 8/2016 | Buller et al. | |
| 9,418,193 B2 | 8/2016 | Dowski, Jr. et al. | |
| 9,457,514 B2 | 10/2016 | Schwärzler | |
| 9,469,057 B2 | 10/2016 | Johnson et al. | |
| 9,478,063 B2 | 10/2016 | Rhoads et al. | |
| 9,481,402 B1 | 11/2016 | Muto et al. | |
| 9,486,878 B2 | 11/2016 | Buller et al. | |
| 9,486,960 B2 | 11/2016 | Paschkewitz et al. | |
| 9,502,993 B2 | 11/2016 | Deng | |
| 9,525,262 B2 | 12/2016 | Stuart et al. | |
| 9,533,526 B1 | 1/2017 | Nevins | |
| 9,555,315 B2 | 1/2017 | Aders | |
| 9,555,580 B1 | 1/2017 | Dykstra et al. | |
| 9,557,856 B2 | 1/2017 | Send et al. | |
| 9,566,742 B2 | 2/2017 | Keating et al. | |
| 9,566,758 B2 | 2/2017 | Cheung et al. | |
| 9,573,193 B2 | 2/2017 | Buller et al. | |
| 9,573,225 B2 | 2/2017 | Buller et al. | |
| 9,586,290 B2 | 3/2017 | Buller et al. | |
| 9,595,795 B2 | 3/2017 | Lane et al. | |
| 9,597,843 B2 | 3/2017 | Stauffer et al. | |
| 9,600,929 B1 | 3/2017 | Young et al. | |
| 9,609,755 B2 | 3/2017 | Coull et al. | |
| 9,610,737 B2 | 4/2017 | Johnson et al. | |
| 9,611,667 B2 | 4/2017 | GangaRao et al. | |
| 9,616,623 B2 | 4/2017 | Johnson et al. | |
| 9,626,487 B2 | 4/2017 | Jung et al. | |
| 9,626,489 B2 | 4/2017 | Nilsson | |
| 9,643,361 B2 | 5/2017 | Liu | |
| 9,662,840 B1 | 5/2017 | Buller et al. | |
| 9,665,182 B2 | 5/2017 | Send et al. | |
| 9,672,389 B1 | 6/2017 | Mosterman et al. | |
| 9,672,550 B2 | 6/2017 | Apsley et al. | |
| 9,676,145 B2 | 6/2017 | Buller et al. | |
| 9,684,919 B2 | 6/2017 | Apsley et al. | |
| 9,688,032 B2 | 6/2017 | Kia et al. | |
| 9,690,286 B2 | 6/2017 | Hovsepian et al. | |
| 9,700,966 B2 | 7/2017 | Kraft et al. | |
| 9,703,896 B2 | 7/2017 | Zhang et al. | |
| 9,713,903 B2 | 7/2017 | Paschkewitz et al. | |
| 9,718,302 B2 | 8/2017 | Young et al. | |
| 9,718,434 B2 | 8/2017 | Hector, Jr. et al. | |
| 9,724,877 B2 | 8/2017 | Flitsch et al. | |
| 9,724,881 B2 | 8/2017 | Johnson et al. | |
| 9,725,178 B2 | 8/2017 | Wang | |
| 9,731,730 B2 | 8/2017 | Stiles | |
| 9,731,773 B2 | 8/2017 | Gami et al. | |
| 9,741,954 B2 | 8/2017 | Bruder et al. | |
| 9,747,352 B2 | 8/2017 | Karmarkar | |
| 9,764,415 B2 | 9/2017 | Seufzer et al. | |
| 9,764,520 B2 | 9/2017 | Johnson et al. | |
| 9,765,226 B2 | 9/2017 | Dain | |
| 9,770,760 B2 | 9/2017 | Liu | |
| 9,773,393 B2 | 9/2017 | Velez | |
| 9,776,234 B2 | 10/2017 | Schaafhausen et al. | |
| 9,782,936 B2 | 10/2017 | Glunz et al. | |
| 9,783,324 B2 | 10/2017 | Embler et al. | |
| 9,783,977 B2 | 10/2017 | Alqasimi et al. | |
| 9,789,548 B2 | 10/2017 | Golshany et al. | |
| 9,789,922 B2 | 10/2017 | Dosenbach et al. | |
| 9,796,137 B2 | 10/2017 | Zhang et al. | |
| 9,802,108 B2 | 10/2017 | Aders | |
| 9,809,977 B2 | 11/2017 | Carney et al. | |
| 9,817,922 B2 | 11/2017 | Glunz et al. | |
| 9,818,071 B2 | 11/2017 | Jung et al. | |
| 9,821,339 B2 | 11/2017 | Paschkewitz et al. | |
| 9,821,411 B2 | 11/2017 | Buller et al. | |
| 9,823,143 B2 | 11/2017 | Twelves, Jr. et al. | |
| 9,829,564 B2 | 11/2017 | Bruder et al. | |
| 9,846,933 B2 | 12/2017 | Yuksel | |
| 9,854,828 B2 | 1/2018 | Langeland | |
| 9,858,604 B2 | 1/2018 | Apsley et al. | |
| 9,862,833 B2 | 1/2018 | Hasegawa et al. | |

(56) References Cited

U.S. PATENT DOCUMENTS

| | | |
|---|---|---|
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | Gangarao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |

(56) References Cited

U.S. PATENT DOCUMENTS

| | | | |
|---|---|---|---|
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 10,493,883 B2 | 12/2019 | Mizobata et al. |
| 2006/0108783 A1 | 5/2006 | Ni et al. |
| 2006/0240220 A1 | 10/2006 | Bohlmann |
| 2009/0081400 A1* | 3/2009 | Wolf ........................ B32B 3/12 |
| | | 428/57 |
| 2011/0135862 A1* | 6/2011 | Sumi ................... B29C 49/0047 |
| | | 428/36.91 |
| 2013/0140278 A1 | 6/2013 | Bruck et al. |
| 2014/0277669 A1 | 9/2014 | Nardi et al. |
| 2014/0301775 A1 | 10/2014 | Erlich et al. |
| 2015/0016712 A1 | 1/2015 | Rhoads et al. |
| 2015/0022423 A1 | 1/2015 | Johnson et al. |
| 2015/0034604 A1 | 2/2015 | Subramanian et al. |
| 2015/0187134 A1 | 7/2015 | Baecher et al. |
| 2016/0325796 A1 | 11/2016 | Czinger et al. |
| 2017/0113344 A1 | 4/2017 | Schönberg |
| 2017/0341309 A1 | 11/2017 | Piepenbrock et al. |
| 2017/0341553 A1 | 11/2017 | Mizobata et al. |

FOREIGN PATENT DOCUMENTS

| | | | |
|---|---|---|---|
| KR | 1020170050744 A | 5/2017 |
| WO | 1996036455 A1 | 11/1996 |
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

Extended European Search Report received for corresponding European Patent Application EP 18813702.0 dated Feb. 2, 2021.

International Search Report and Written Opinion dated Oct. 17, 2018 regarding PCT/US2018/036328, 11 pages.

* cited by examiner

INTERCONNECTED DEFLECTABLE PANEL AND NODE

BACKGROUND

Field

The present disclosure relates generally to techniques for interconnecting a panel to a node, and more specifically to additively manufacturing techniques for printing a node with a tapered socket and interconnecting a panel by deforming the panel to conform to the shape of the tapered node.

Background

Additive Manufacturing (AM) processes involve the layer-by-layer buildup of one or more materials to make a 3-dimensional object. AM techniques are capable of fabricating complex components from a wide variety of materials. Typically, a freestanding object is fabricated from a computer aided design (CAD) model. Using the CAD model, the AM process can create a solid 3-dimensional object by using a laser beam to sinter or melt a powder material, which then bonds the powder particles together. In the AM process, different materials or combinations of material, such as, engineering plastics, thermoplastic elastomers, metals, and ceramics may be used to create a uniquely shaped 3-dimensional object.

Several different printing techniques exist. One such technique is called selective laser melting. Selective laser melting entails fusing (agglomerating) particles of a powder at a temperature below the melting point of the powder material. More specifically, a laser scans a powder bed and melts the powder together where structure is desired, and avoids scanning areas where the sliced data indicates that nothing is to be printed. This process may be repeated thousands of times until the desired structure is formed, after which the printed part is removed from a fabricator.

As AM processes continue to improve, more complex mechanical manufacturers are beginning to investigate the benefits of using additively manufactured parts in their designs. This is because, achieving efficient and effective manufacturing processes at low costs are perpetual goals of manufacturing sectors of many industries. For instance, the automotive industry, aircraft manufacturing, and other industries involved in the assembly of transport structures are constantly engaging in cost saving optimizations and looking for opportunities to improve manufacturing processes. Joining components with a multitude of shapes is one such area that has proven to be difficult to optimize. For instance, conventional manufacturing processes provide simple internal geometric shapes such as rectangles without additional features. These simple internal structures limit the configuration of components that may be interconnected. As a result, such manufacturing processes have a limited practical range, because they cannot be efficiently used to produce complex geometrical structures having the potential to provide new and different features and capabilities.

The recent advances in 3-dimensional printing or AM processes have presented new opportunities to build wide varieties and ranges of simple to very complex parts at relatively competitive costs. With AM, components with unique internal structures may be printed which may provide greater options when joining components. However, these unique shapes present a new unique set of challenges to joining components capable of deforming to fit the shape of more complex internal structures. For instance, a socket connection requires an internal fit that is not externally visible to a welder at a conventional manufacturing plant. Therefore, it can be difficult to join a socket component with a unique internal structure to a deformable component.

SUMMARY

Several aspects of techniques for joining an additively manufactured node to a component will be described more fully hereinafter with reference to 3-dimensional printing techniques.

One aspect of an apparatus includes an additively manufactured node having a socket. The apparatus includes a panel interconnected with the node. The panel includes opposing surface layers and a core between at least a portion of the surface layers. The socket engages an end portion of the panel and shapes the surface layers on the end portion of the panel.

One aspect of a method includes printing a node having a socket by additive manufacturing. The method interconnects a panel with the node. The panel includes opposing surface layers and a core between at least a portion of the surface layers. The method engages the socket with an end portion of the panel. By the socket, the method shapes the surface layers on the end portion of the panel.

It will be understood that other aspects of co-printing interconnects with additively manufactured nodes will become readily apparent to those skilled in the art from the following detailed description, wherein it is shown and described only several embodiments by way of illustration. As will be realized by those skilled in the art, the co-printing of interconnects with additively manufactured nodes are capable of other and different embodiments and its several details are capable of modification in various other respects, all without departing from the invention. Accordingly, the drawings and detailed description are to be regarded as illustrative in nature and not as restrictive.

BRIEF DESCRIPTION OF THE DRAWINGS

Various aspects of co-printing interconnects with additively manufactured nodes will now be presented in the detailed description by way of example, and not by way of limitation, in the accompanying drawings, wherein.

DETAILED DESCRIPTION

Figure 1:
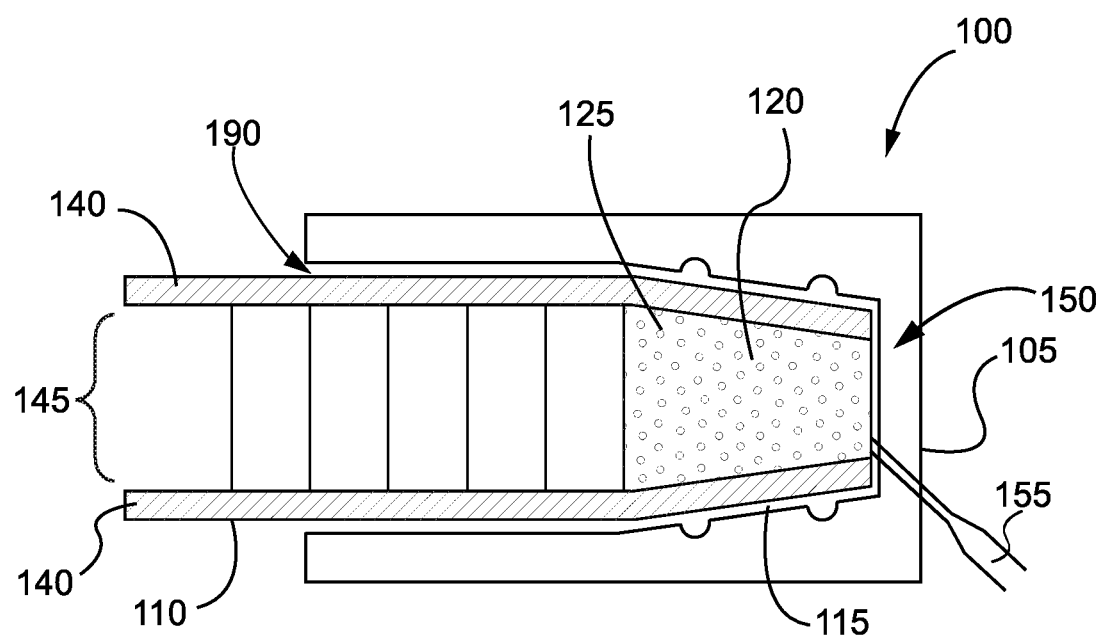
FIG. 1 illustrates an exemplary embodiment of an apparatus comprising a node and a panel interconnected with the node.

The detailed description set forth below in connection with the appended drawings is intended to provide a description of various exemplary embodiments of additively manufacturing techniques for co-printing nodes and interconnects and is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

The use of additive manufacturing in the context of joining two or more parts provides significant flexibility and cost saving benefits that enable manufacturers of mechanical structures and mechanized assemblies to manufacture parts with complex geometries at a lower cost to the consumer. The joining techniques described in the foregoing relate to a process for joining additively manufactured parts and/or commercial of the shelf (COTS) components such as panels. Additively manufactured parts are 3-dimensionally printed by adding layer upon layer of a material based on a preprogramed design. The parts described in the foregoing may be parts used to assemble a motor vehicle such as an automobile. However, those skilled in the art will appreciate that the manufactured parts may be used to assemble other complex mechanical products such as vehicles, trucks, trains, motorcycles, boats, aircraft, and the like without departing from the scope of the invention.

One important issue that has been encountered in these industries is how to enable various disparate parts or structures to more efficiently interconnect. One such technique as disclosed herein involves the use of additive manufacturing. More specifically, by utilizing additive manufacturing techniques to print unique parts, it becomes simpler to join different parts and/or components in the manufacturing process. Such techniques can include deforming a portion of one part to conform to the internal shape of another. Additive manufacturing provides the ability to create complex internal shapes that were not previously possible using conventional manufacturing techniques. For example, a deformable panel having an end portion with a notch therebetween may be inserted into a node having a uniquely tapered shape. In the joining process, the end portion of the panel can deform into the internal shape of the node, which creates a stronger and simpler bond between the now interconnected components.

As will be discussed herein, a node is an example of an additively manufactured part. A node may be any 3-D printed part that includes a socket for accepting a component such as a panel. The node may have internal features configured to accept a particular type of component. Such features may be co-printed with the node. Alternatively or conjunctively, the node may be shaped to accept a particular type of component. For instance, the internal shape of a node may taper or expand to deform a deflectable panel according to the shape of the node's internal socket and then accept an adhesive to adhere the component to the node. However, as a person having ordinary skill in the art will appreciate, a node may be shaped to accept any type of component and utilize any internal design or shape and accept any variety of components without departing from the scope of the disclosure.

FIG. 1 illustrates an exemplary embodiment of an apparatus 100 comprising a node and a panel interconnected with the node. In some embodiments of the apparatus, the panel may comprise a deflectable panel. As shown, the apparatus 100 includes anode 105, a panel 110, and injection port 155, a socket 115, and a socket opening 190. The panel 110 includes surface layers 140, a core 145, and an end portion 150. The end portion 150 includes a filler material 125. The filler material may be a cross-linkable polymer such as an epoxy or a liquid adhesive. In some aspects of the apparatus, the end portion 150 may also include microballoons 120 in the filler material 125. In some aspects of the apparatus, the opposing surface layers 140 may be carbon fiber sheets. At least of a portion of the core 145 may be removed from between the surface layers 140. In some aspects of the apparatus, the end portion 150 may be without the core 145. Consequently, the filler material 125 may be injected into the available area near end portion 150 between the surface layers 140. The filler material 125 may be injected by way of the injection port 155. The microballoons 120 may be used to make the filler material 125 less dense without compromising structural integrity so that it may be compressed as shown in FIG. 1. For instance, microballoons may be incorporated into a material such as an epoxy to form a less dense slurry that can be deformed or compressed as necessary. However, a liquid adhesive, or any suitably curable and malleable substance may be used as the filler material 125 illustrated in FIG. 1.

The surface layers 140 may sandwich a core material 145 such as a honeycomb-like material or foam. The core 145 may remain between at least a portion of the surface layers 140, at least until the panel 110 is joined to the node 105. In order to join the node 105 and the panel 110, the end portion 150 of the surface layers 140 of the panel 110 may be compressed and deformed to fit into the socket 115 as it is being slid through the socket opening 190. As shown, the tapering within the socket 115 increases, or the socket narrows, as the distance from the socket opening 190 increases. The narrowing socket causes the panel 110 to compress. As a result, the end portion 125 of the panel 110 may be compressed against the node 105 so that it fits into the socket 115. In some aspects of the apparatus, a sealant and/or an adhesive may subsequently be injected into the socket 115 to fix the panel 110 to the node 105 in the deformed configuration. The notches along the socket 115 may provide a path for the sealant and/or adhesive, but are not necessary to effectively bond the panel 110 and the node 105.

Figure 2A:
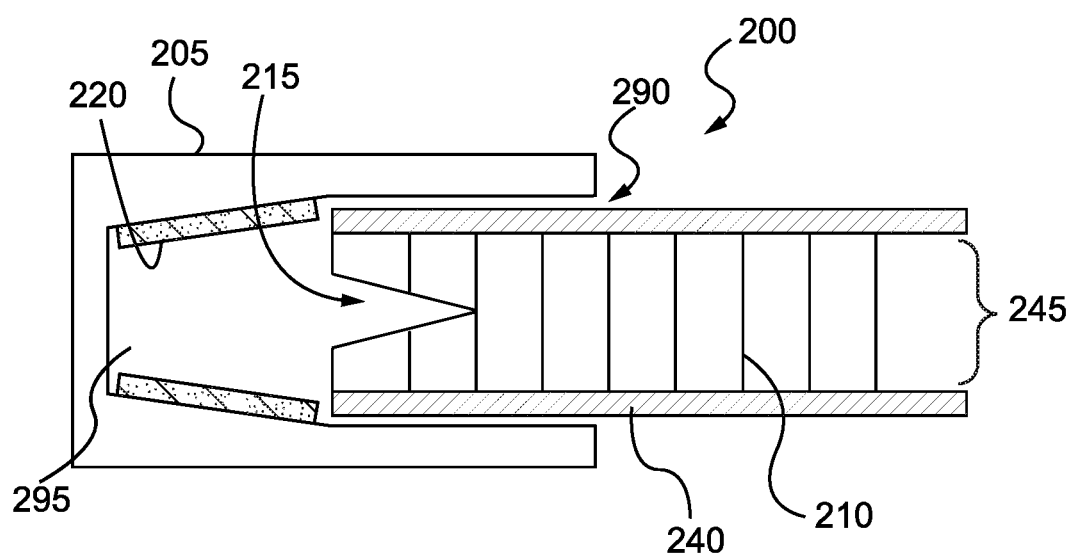
FIGS. 2A-2B illustrate an exemplary embodiment of an apparatus comprising a node and a panel engaged by narrowing a tapered socket.
Figure 2B:
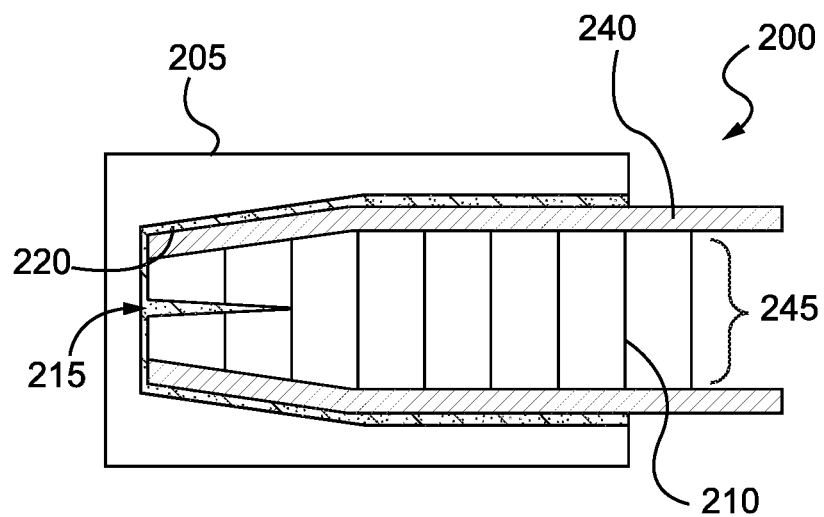

FIG. 2A illustrates an exemplary embodiment of an apparatus 200 comprising a node 205 and a panel 210 engaged by a narrowing tapered socket. Similar to the panel 110 of FIG. 1, the panel 210 may be a deflectable panel capable of deforming by expansion or compression. As shown, the panel 210 includes a notch 215, surface layers 240, and a core 245. The node 205 includes a socket 295 with an adhesive layer 220 and a socket opening 290. FIG. 2B illustrates the apparatus 200 comprising the panel 210 interconnected with the node 205. In some aspects of the apparatus, the panel 210 may be inserted by way of the socket opening 290 into the socket 295 of the node 205. As shown, like in FIG. 1, the socket 295 comprises a tapered portion that narrows with increased distance from the socket opening 290. When the panel 210 is inserted, the notch 215 may compress by the tapered portion such that the end portion of the panel 210 surrounding the notch 215 conforms to the shape of the node 205. Moreover, as one skilled in the art will appreciate, the interface between the node and the panel may be similar to the socket 130 interface illustrated in FIG. 1 without departing from the scope of the disclosure.

The surface layers 240 may comprise a lightweight sturdy material, such as a composite material. Such composite materials may include carbon fiber. The composite material may have greater flexibility than the core material, which may be achieved by reducing the stiffness of the core 245. The flexibility of the surface panels 240 enables the end portion of the panel 210 that is inserted into the node 205 to become malleable and conform to the shape of the node socket 295 to form a secure bond. As will be discussed in the foregoing, a node may be configured to cause surface panels to conform to many different shapes and arrangements.

Additionally, the adhesive layer 220 may then surround the portion of the panel 210 that is enclosed within the node 205. In some aspects of the apparatus, the adhesive layer 220 is a film foam adhesive. In such aspects, film foam adhesives are harder than, cure faster than, and provide a stronger bond than liquid adhesives. The adhesive layer 220 may cure to fix the interconnected panel 210 with the node 205. An external heat source, such as an oven, may apply heat to the panel/node connection and cause the adhesive layer 220 to cure. As will be discussed below, the adhesive may be applied to the panel 210 prior to inserting the panel 210 into the node 205.

Figure 3A:
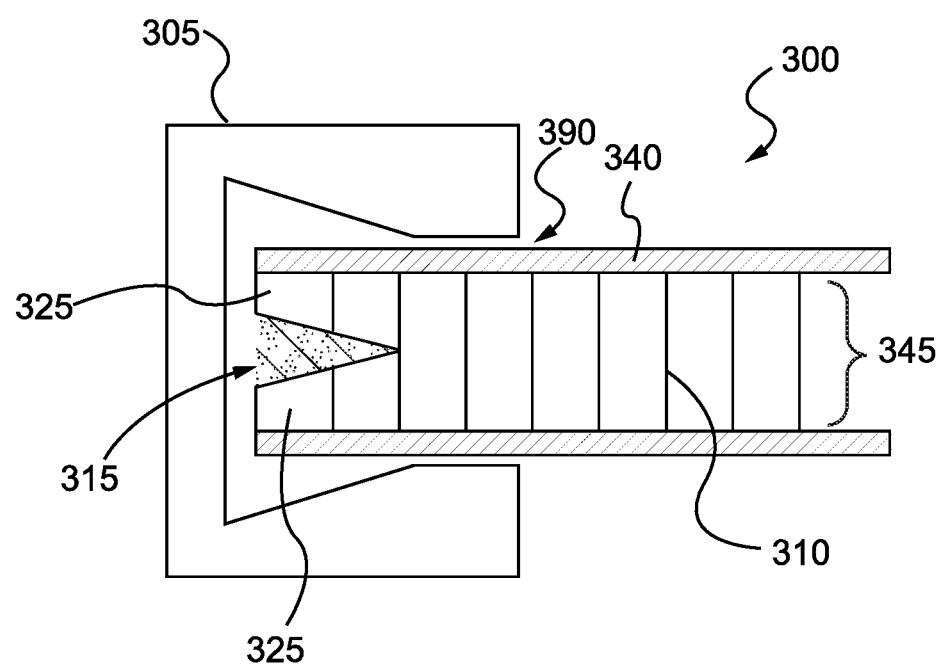
FIGS. 3A-3C illustrate an exemplary embodiment of an apparatus comprising a node and a panel engaged by a widening tapered socket.
Figure 3B:
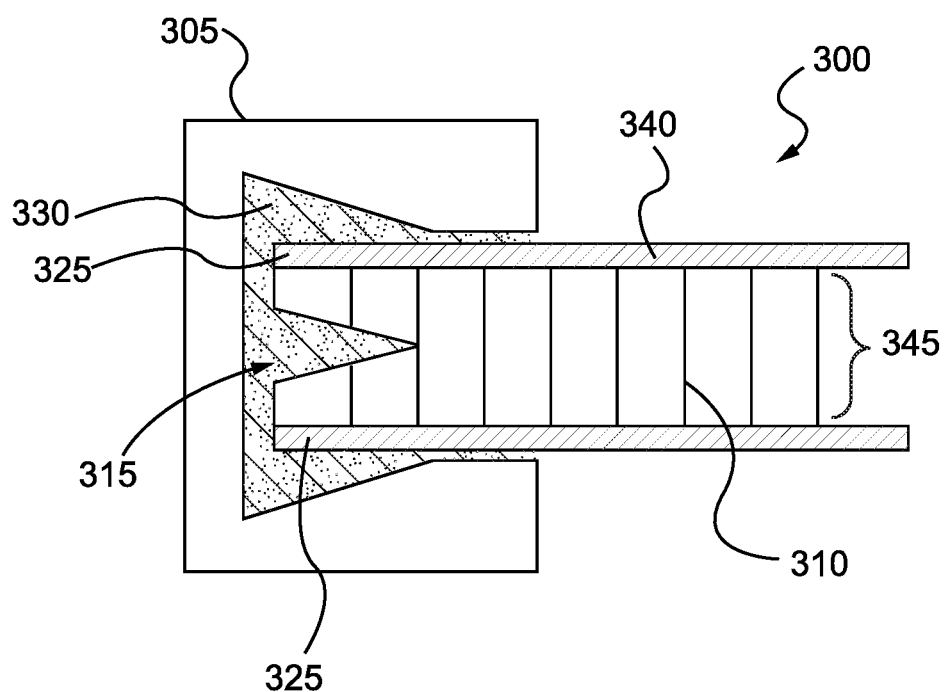
Figure 3C:
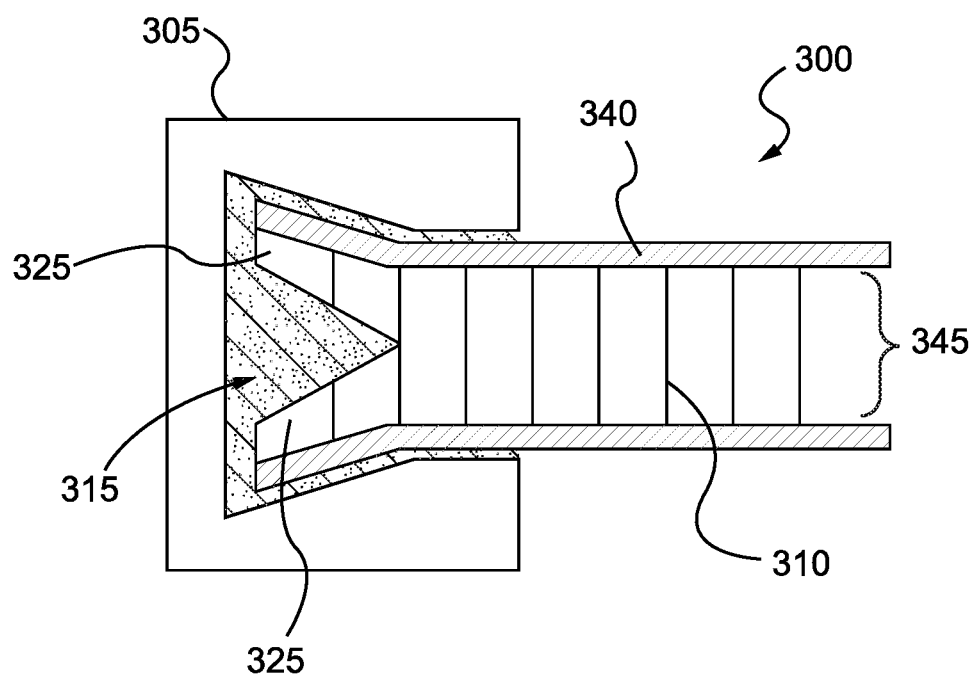

FIGS. 3A-3C illustrate an exemplary embodiment of an apparatus 300 comprising a node 305 and a panel 310 engaged by a widening tapered socket. FIG. 3A illustrates a node and interconnected panel prior to bonding, while FIGS. 3B and 3C illustrate the following steps of bonding the node and the panel. FIGS. 3A-3C include an apparatus 300. The apparatus 300 includes a node 305 and a panel 310. Similar to the panels 110 and 210, the panel 310 includes surface layers 340 and a core 345. The panel 310 also includes a deformable edge 335 and a notch 315. A portion of the core may be cut out to form the notch. Inside the notch is a pre-applied adhesive 325, that may foam and/or disperse when heated. The node 305 further includes a socket 330 and a socket opening 390.

As shown in FIG. 3A, the notch 315 may be created in the core 345. In some embodiments of the apparatus, at least a portion of the core 345 is removed. In some aspects of the apparatus, the adhesive 325 may be heated using an external source. When the temperature of the adhesive 325 reaches a particular point, the adhesive may begin to foam and expand into the socket 330. The adhesive 325 may be applied to the panel 310 prior to inserting the panel 310 into the node 305.

As shown in FIG. 3B, as the adhesive 325 begins to foam, it starts to fill the socket 330 of the node 305. As the adhesive 325 continues foaming, it may cause the panel 310 to expand, as shown in FIG. 3C. Thus, in contrast to the apparatus 200 of FIG. 2, the socket 330 may comprise a tapered portion that widens with distance from the socket opening 390. As a result, the deformable edges and the notch 335 may expand, causing the notch 315 to widen. In such aspects, the deformable edges 335 of the panel 310 may expand due to the action of the adhesive 325 to conform to the geometry of the socket 330 of the node 305. As discussed above, the surface layers 340 of the deformable ends 335 may have greater flexibility or compressibility than the core 345 because the stiffness of the core is reduced by the notch 315. Thus, the socket 330 expands the notch 315 according to the shape of the socket 330, in contrast to the panel that has the flexibility to fit the tapered socket in FIG. 2.

In the above example, the adhesive may be a film foam adhesive. However, in some aspects of the apparatus the adhesive 325 may be a liquid adhesive. The use of a liquid adhesive may require additional material and manufacturing time. For instance, when using a liquid adhesive, a liner may be applied between the notch 315 in the core 345 and the pre-applied adhesive 325. The liner is used to prevent the adhesive from migrating into the core 345. For instance, since the core 345 is typically made of a material with a honeycomb-like structure, a liquid adhesive could seep into the holes of the core's honeycomb structure in the absence of a liner.

Additionally a sealant may be necessary to seal the adhesive 325 to the node 305. Thus, when interconnecting the node 305 with the panel 310, a sealant may be pre-applied to at least one internal side of the node socket 330. Without the sealant, a proper seal between the socket 330 and the panel 310 may not be formed after the adhesive 325 cures.

Heat may then be applied to the apparatus, similar to the example above. As the temperature increases from the heat, the sealant may first begin to foam in order to form a seal around the edges of the socket 330. The adhesive 325 may subsequently foam, filling the cavity between the panel 310 and the sealant. In some aspects of the apparatus, the sealant may foam at a lower temperature than the adhesive 330. In such aspects, during the interconnecting process, heat may be applied to the node 305 and panel 310. As the temperature rises, the sealant would foam first. The heat may be applied such that the sealant has sufficient time to partially or fully cure before the temperature reaches the foaming point for the adhesive 325. After the adhesive 325 fills the cavity between the sealant within the socket 330 and the panel 310, the temperature may remain at a point that allows the adhesive 325 to cure and bond the node 305 and the panel 310 together, while also sealing the interface between the node 305 and the panel 310. The heat may be applied to the apparatus 300 from an external heat source.

Alternatively, when a film foam adhesive is used, as discussed above, applying sealant may be unnecessary for forming a seal between the node 305 and the adhesive 325 because the film foam adhesive is capable of forming the seal on its own. As a result, bonding time is reduced. Thus, when faster bonding times are needed, it may be important use a film foam adhesive in order to bypass the step of applying a sealant so that a faster bonding time can be achieved. Moreover, in some aspects of the apparatus, additively manufactured features may be printed in the node 305, where the node 305 acts as a tapering mechanism such that the panel 310 may deflect before the adhesive 325 flows through the node socket. The following figure illustrates a node with such printed features.

Figure 4:
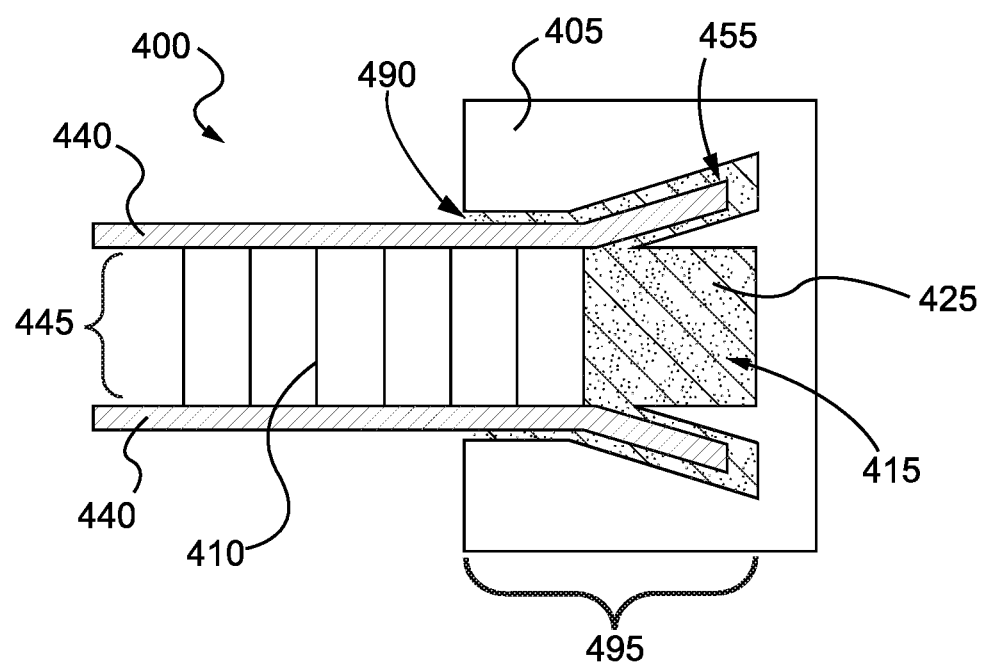
FIG. 4 illustrates an exemplary embodiment of an apparatus having a node with additively manufactured features designed to cause a panel to taper upon insertion into a node.

FIG. 4 illustrates an exemplary embodiment of an apparatus 400 having a node with additively manufactured features configured to cause a panel to taper upon insertion into a node. As shown, the apparatus 400 includes a node 405, a panel 410, and adhesive 425. The node 405 includes a tapering feature 455, socket 495, and socket opening 490. The panel 410 includes a core 445, and surface layers 440. As shown, a portion 415 of panel 410 surface layers 440 is without the core.

As discussed above, the tapering feature 455 expands with distance from socket opening 490. The tapering feature 455 is configured to cause the portion 415 of the surface layers 440 without the core 445 therebetween to deform, or taper, when the panel 410 is inserted into the node 405, and prior to the flow of the adhesive through the socket 495. As shown, the surface layers 440 may conform to the shape of the tapering feature 455. Unlike conventional manufacturing techniques, such as welding, additive manufacturing techniques enable the tapering features to be co-printed inside of the node. It is often difficult to add such features internal to a structure with conventional manufacturing techniques. Moreover, the tapering features 455 illustrated in FIG. 4 are merely exemplary illustration of a feature that may be co-printed with a node to shape a panel or other component according to the geometry of the tapering feature. In fact, any co-printed feature that is configured to accept a component, or portion of a component (e.g., surface layer of a panel) may be utilized in order to increase customizability without departing from the scope of the disclosure.

Thus, additive manufacturing techniques allow for deforming or deflecting a component such as a panel prior with co-printed features prior to affixing the panel to a node. The deflections allow for a more stronger and more customizable interconnection that was not previously achievable. Stronger interconnections are beneficial to highly complex manufactured structures that may be under a lot of stress such as land, sea, and air vehicles. However, one having ordinary skill in the art will appreciate that the above techniques are applicable to any structure or manufacturing process requiring strong adhesion and/or faster bonding times.

Figure 5:
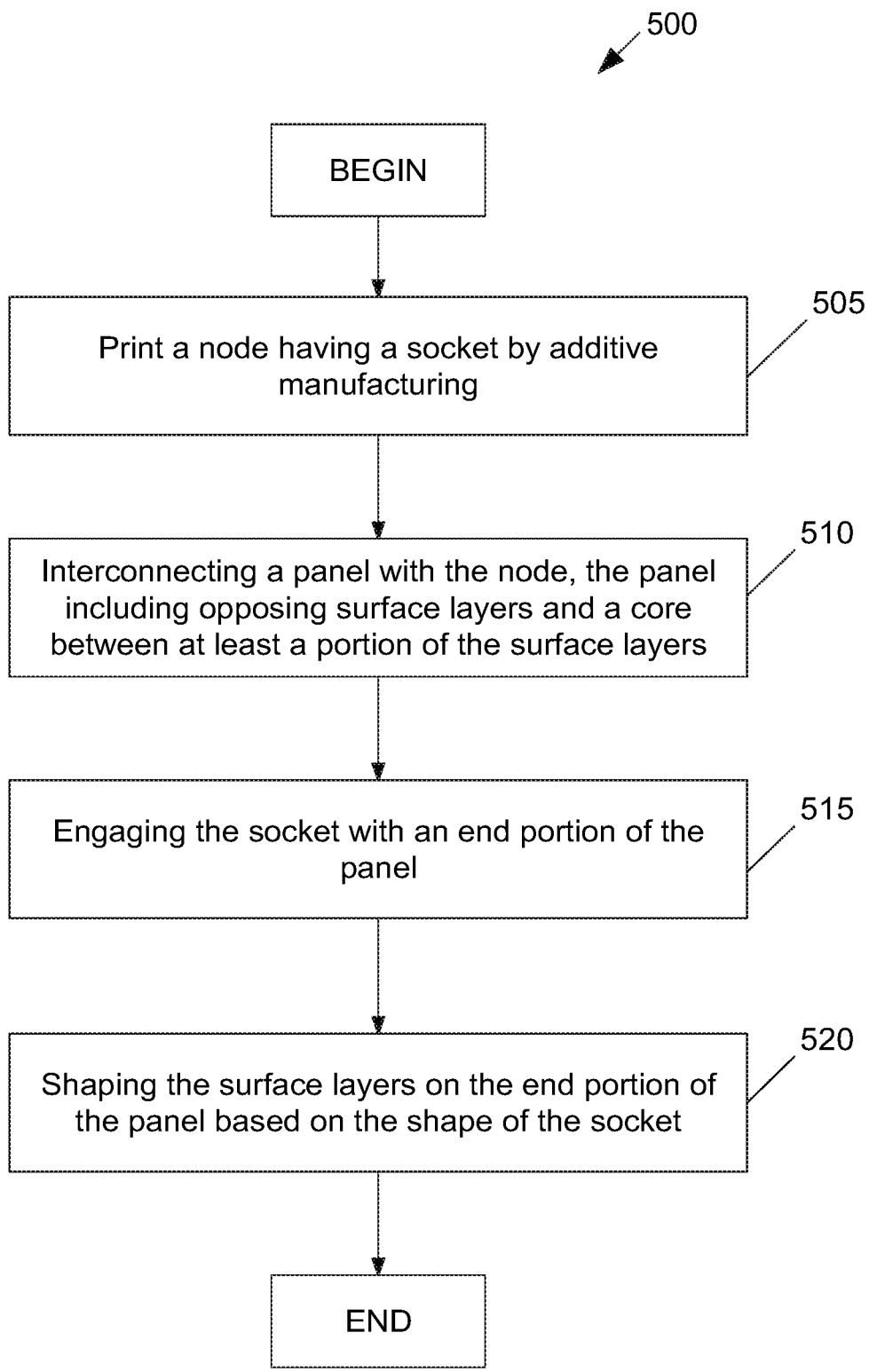
FIG. 5 conceptually illustrates a process 500 for utilizing co-printed internal features in joining a panel with a node.

FIG. 5 conceptually illustrates a process 500 for utilizing co-printed internal features in joining a panel with a node. The panel may be a deflectable panel configured to have greater flexibility by reducing the stiffness of a core material between surface layers of the panel. The process 500 may be performed by a mechanical device. The process 500 begins when instructions to additively manufacture a part are provided. The process 500 may be performed in connection with the apparatuses 100, 200, 300, and 400 discussed above with respect to FIGS. 1-4.

At 505, the process 500 prints a node having a socket by additive manufacturing. The process 500 interconnects (at 510) a panel with the node. The panel may include opposing surfaces layers and a core between at least a portion of the surface layers. As discussed above, at least a portion of this core may be removed during the joining process. The process 500 engages (at 515) the socket with an end portion of the panel. After engaging the socket with the end portion, the process 500 shapes (at 520) the surface layers on the end portion of the panel based on the shape of the socket. For instance, as shown in FIGS. 1 and 2, the deflectable end portions of the panel may have sufficient flexibility to compress and fit into a tapered node socket. This may be achieved by reducing the stiffness of the core. Conversely, as shown in FIGS. 3 and 4, for example, the deflectable ends may have the flexibility to expand and fit into a wider socket. Similarly, this may be achieved by removing at least a portion of the core from the expanded ends, which reduces the stiffness of the core.

The ability to additively manufacture nodes creates the opportunity to shape components such as panels to provide stronger interconnections. By tapering or expanding the ends of the panels, simpler and more cost efficient approaches for joining a node and a panel can be achieved. Additive manufacturing provides the ability to generate parts with geometric features that are not otherwise possible using conventional manufacturing techniques.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for printing nodes and interconnects. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus, comprising:
an additively manufactured node having a socket; and
a deformable panel interconnected with the node, the panel comprising opposing surface layers and a core between at least a portion of the surface layers, wherein an end portion of the panel expands into the internal shape of the socket,
wherein the socket comprises a tapering feature configured to move the opposing surface layers on the end portion of the panel from a first relative spaced apart distance to a second relative spaced apart distance in response to inserting of the end portion of the panel into the socket, and wherein the second relative spaced apart distance is greater than the first relative spaced apart distance.

2. The apparatus of claim 1, wherein the surface layers on the end portion of the panel are without at least a portion of the core between them.

3. The apparatus of claim 1, wherein the opposing surface layers on the end portion of the panel further extend beyond the core.

4. The apparatus of claim 2, wherein the panel further comprises an adhesive filler material comprising a plurality of microballoons between the surface layers on the end portion of the panel.

5. The apparatus of claim 1, wherein a section of the core extends between the surface layers of the end portion of the panel, and wherein the section of the core comprises a notch.

6. The apparatus of claim 5, wherein an adhesive extends from the notch into the socket.

7. The apparatus of claim 6, further comprising a sealant between the panel and the socket to seal the adhesive in the socket.

8. The apparatus of claim 5, wherein the socket comprises a tapered portion that narrows with distance from the socket opening, and wherein the notch is compressed by the tapered portion.

9. The apparatus of claim 5, wherein the socket comprises a tapered portion that widens with distance from the socket opening, and wherein the notch expands in response to the end portion of the panel expanding into the internal shape of the tapered portion.

10. The apparatus of claim 1, wherein the opposing surface layers are spaced apart by a first distance prior to being interconnected with the node and by a second distance subsequent to be interconnected with the node, wherein the second distance is greater than the first distance based upon the end portion of the panel expanding into the internal shape of the socket.

11. The apparatus of claim 10, further comprising an adhesive positioned between the opposing surface layers adjacent to the end portion of the panel, wherein the adhesive is configured to transition between an initial state and an expanded state, wherein the transition causes the end portion of the panel to expand into the internal shape of the socket.

12. The apparatus of claim 1, further comprising an adhesive positioned between the opposing surface layers adjacent to the end portion of the panel, wherein the adhesive is configured to transition between an initial state and an expanded state, wherein the transition causes the end portion of the panel to expand into the internal shape of the socket.

13. The apparatus of claim 1, wherein an adhesive is configured to transition between an initial state and an expanded state in response to heat.

14. The apparatus of claim 1, wherein the tapering feature comprises a first set of inner walls defining a first channel configured to receive a first one of the opposing surface layers and a second set of inner walls defining a second channel configured to receive a second one of the opposing surface layers.

* * * * *